Figure 1:
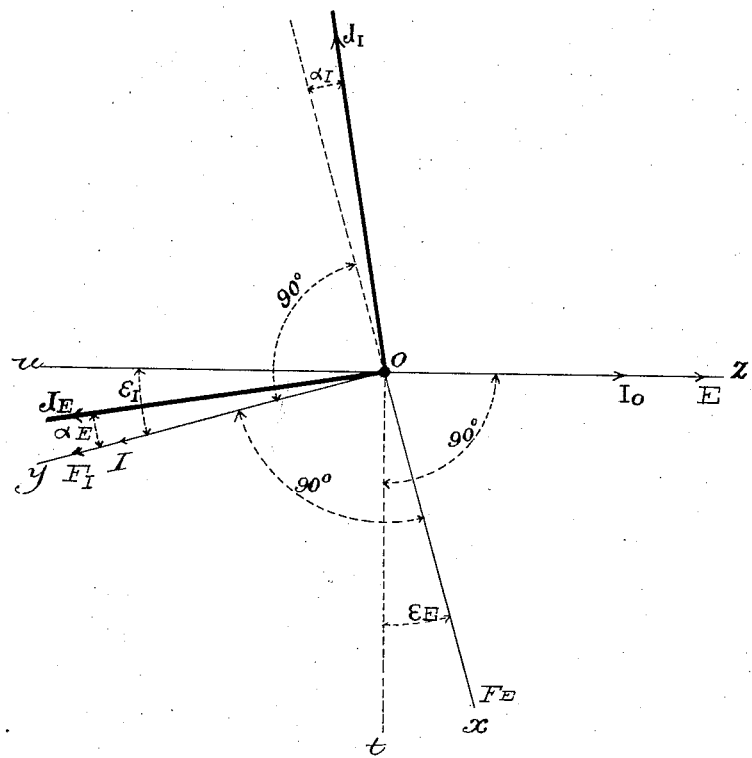

No. 768,557. PATENTED AUG. 23, 1904.
A. BLANCHET.
ELECTRICITY METER.
APPLICATION FILED MAR. 27, 1902.
NO MODEL. 4 SHEETS—SHEET 1.

Witnesses:
Jas J. Maloney
Nasey P. Ford

Inventor,
Arthur Blanchet
by J. P. and H. P. Livermore
attys

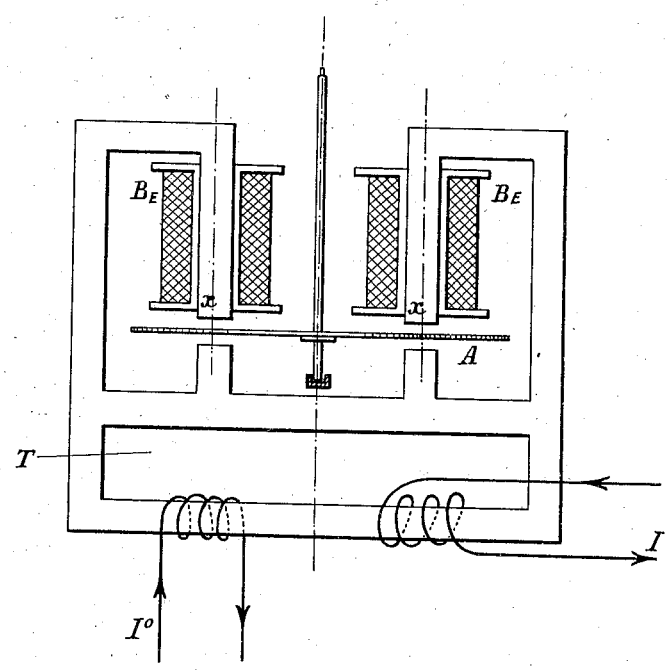

No. 768,557.

Patented August 23, 1904.

UNITED STATES PATENT OFFICE.

ARTHUR BLANCHET, OF PARIS, FRANCE, ASSIGNOR TO COMPAGNIE POUR LA FABRICATION DES COMPTEURS ET MATÉRIEL D'USINES À GAZ, SOCIÉTÉ ANONYME, OF PARIS, FRANCE.

ELECTRICITY-METER.

SPECIFICATION forming part of Letters Patent No. 768,557, dated August 23, 1904.

Application filed March 27, 1902. Serial No. 100,195. (No model.)

*To all whom it may concern:*

Be it known that I, ARTHUR BLANCHET, electrical engineer, a citizen of the Republic of France, residing at 23 Boulevard Montparnasse, Paris, France, have invented a certain new and useful Improvement in Electricity-Meters, (for which Letters Patent have been secured in France under date of August 28, 1901, No. 313,858, and for which Letters Patent have been applied for in Germany under date of November 5, 1901; in Italy under date of February 26, 1902; in Spain under date of February 26, 1902; in Switzerland under date of February 27, 1902; in Austria under date of February 28, 1902; in Hungary under date of February 28, 1902; in Belgium under date of February 27, 1902, all in the name of the Compagnie Pour la Fabrication des Compteurs et Matériel D'Usines à Gaz, Société Anonyme, capital seven million francs, and in England [provisional] under date of February 27, 1902, No. 5,010, in the name of Arthur Blanchet;) and I do hereby declare that the following is a full, clear, and exact specification of the same.

This invention relates to monophase alternating-current electricity-meters, and more especially to meters wherein the power is measured by the speed of rotation of a disk or cylinder (armature) on which a magnetic field proportional to the voltage of the distribution and a magnetic field proportional to the current act at the same time. The first-mentioned field is produced by a winding or an electromagnet in shunt and the second-mentioned by an electromagnet or winding in series. The two fields are so arranged that the currents induced in the armature by the first field are subjected to the action of the other field, and vice versa. The resulting couple is balanced by a resistance couple proportional to the speed of rotation of the armature obtained by the action of one or more permanent magnets that act on the same armature or on another armature rigidly connected thereto. To enable a combination of this kind to form a watt-hour meter, the speed of the armature must always be proportional to the power $EI_0 \cos. \gamma$, E being the voltage of the line, $I_0$ the current, and $\gamma$ the angle representing the difference of phase of E and $I_0$, and for this purpose it is necessary that the motive couple or torque should be proportional to the power and that there be no other resistance couple but that due to the magnets. A large number of combinations have been proposed to enable this result to be attained. In general they consist in displacing either the flux of the electromotive force or that of the current, or both, so as to obtain finally two fluxes displaced by ninety degrees (or a quarter of a period) in relation to each other when $I_0$ and E are in phase. When $I_0$ and E are displaced by an angle of $\gamma$, this displacement will occur in the flux corresponding to the current, and the couple will remain proportional to the watts. For the purpose of obtaining this displacement between the phase $F_E$, corresponding to the electromotive force and the phase $F_I$ due to the main current, I employ a small transformer whose primary circuit is included in the main circuit and whose secondary circuit is closed on one of the sets of coils or electromagnets that act on the armature. The other set forms part of a shunt-circuit which is subjected to the difference of potential E and possesses great self-induction. The transformer is constructed in such a way that the secondary current is proportional to the primary current within the limits in which the apparatus operates. I regulate the resistance of the secondary circuit of the transformer in such a way that its time constant is the same as that of the shunt-circuit by complying with the condition:

$$\frac{L_E}{R_E} = \frac{\Sigma L_I}{\Sigma R_I} (a,)$$

where $L_E$ and $R_E$ represent, respectively, the self-induction and the resistance of the shunt-circuit, and $\Sigma L_I$ and $\Sigma R_I$ the corresponding quantities in relation to the secondary circuit of the transformer including the coils or electromagnets $B_I$ that form part thereof and produce the flux $F_I$. Under these conditions the fluxes $F_E$ and $F_I$ are displaced by an angle of ninety degrees when $E$ and $I_0$ are in phase. This is indicated by the diagram of Figure 1, in which, first, $o\,z$ indicate the direction of the electromotive force $E$ and of the main current $I_0$; second, $o\,y$ indicate the the direction of the secondary current, which corresponds with the direction of flux $F_I$; third, $o\,x$ indicate the direction of flux $F_E$; fourth, currents $J_E$ and $J_I$, induced in the armature by said fluxes, are shown by thicker lines with their respective displacements $\alpha_E$ and $\alpha_I$ in dotted lines. It will be seen that $o\,u$ and $o\,z$ are parts of a single straight line and that $o\,t$ is at right angle to $u\,o\,z$. According to condition $(a)$ $\varepsilon_E = \varepsilon_I$, and the displacement of the fluxes is exactly of ninety degrees. The angles $\varepsilon_E$ and $\varepsilon_I$ are determined by the relations $$\tan \varepsilon_E = \frac{R_E}{\omega L_E}$$

$$\tan \varepsilon_I = \frac{\Sigma R_I}{\omega \Sigma L_I}$$

Therefore, if condition $a$ is satisfied, $$\varepsilon_E = \varepsilon_I;$$

but $$\widehat{F_E\,F_I} = \widehat{x\,o\,y} = \widehat{x\,o\,t} + \widehat{t\,o\,u} - \widehat{w\,o\,y}$$

and $$\widehat{x\,o\,t} = \varepsilon_E$$

and $$\widehat{w\,o\,y} = \varepsilon_I$$

so that $$\widehat{F_E\,F_I} = \widehat{t\,o\,u} = 90°.$$

When $I_0$ is displaced by an angle $\gamma$ in relation to $E$, this displacement will occur in $I_0$ and $F_I$, and consequently in $J_I$. I have found that when the angles $\alpha_E$ and $\alpha_I$ are small and approximately equal, which is always possible in practice, the motive couple or torque resulting from the sum of the actions of $F_E$ on $J_I$ and of $F_I$ on $J_E$ remains practically proportional to the $\cos \gamma$, so that the apparatus constitutes under the conditions indicated a real watt-hour meter whose indications are practically independent of the variations in the frequency, the voltage, and the displacement $\gamma$ within the practical limits. For this purpose it is necessary that the fluxes $F_E$ and $F_I$ should be small in relation to the magnetic field of the brake-magnets.

Figure 2:
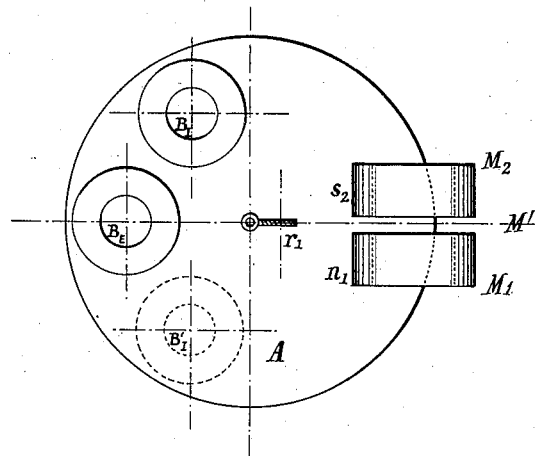
Figure 3:
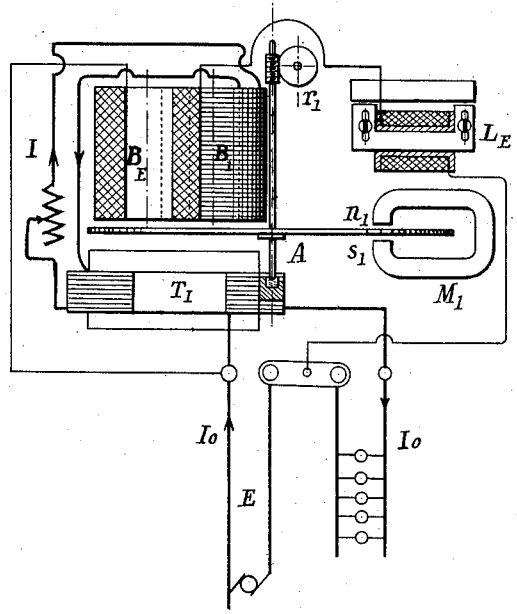

Figs. 2 and 3 shows diagrammatically an example of my meter, which comprises, essentially, an armature $A$, made of a good conducting metal, on which there act two sets of coils or electromagnets $B_I$ $B_E$, arranged symmetrically in relation to $A$, and of which one, $B_E$, is traversed by a shunt-current proportional to the volts $E$ and not in phase therewith and of which the other, $B_I$, is inserted into the secondary circuit of the transformer $T_I$ of which the primary circuit is in series with the consumption-circuit, the entire arrangement being carried out in accordance with the conditions hereinbefore described, so as to make the couple proportional to the power. This motor is retarded by a magnetic brake, comprising magnets $M_1$ $M_2$, that act on the same armature or on another armature rigidly connected thereto while giving a couple proportional to the speed, so that the said speed will finally be proportional to the power. The number of revolutions is registered by a registering-train, of which $r_1$ is the first wheel which engages, for example, with a worm keyed on the arbor of the moving part. In certain cases in order to obtain a considerable displacement of $F_E$ in relation to $E$, I add a self-induction coil $L_E$ in the shunt-circuit, and by varying the air-gap in the magnetic circuit of this coil I can vary the time constant of its circuit and obtain the desired regulation. The same regulation may be obtained by means of an adjustable resistance $R_I$ inserted into the secondary circuit of the transformer, so as to comply with the condition $a$, which can be verified in practice by ascertaining if the meter indicates the same thing for the watts displaced as for the watts in phase.

Figure 4:
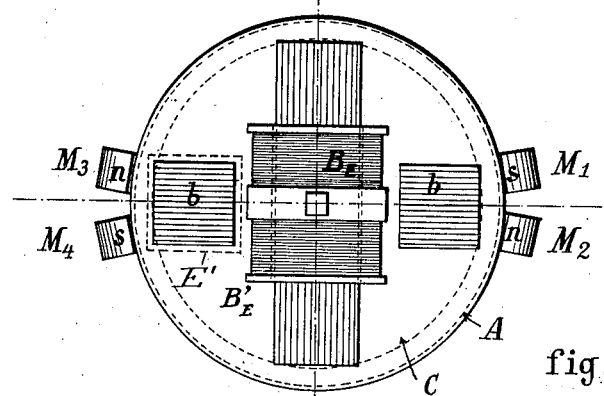
Figure 5:
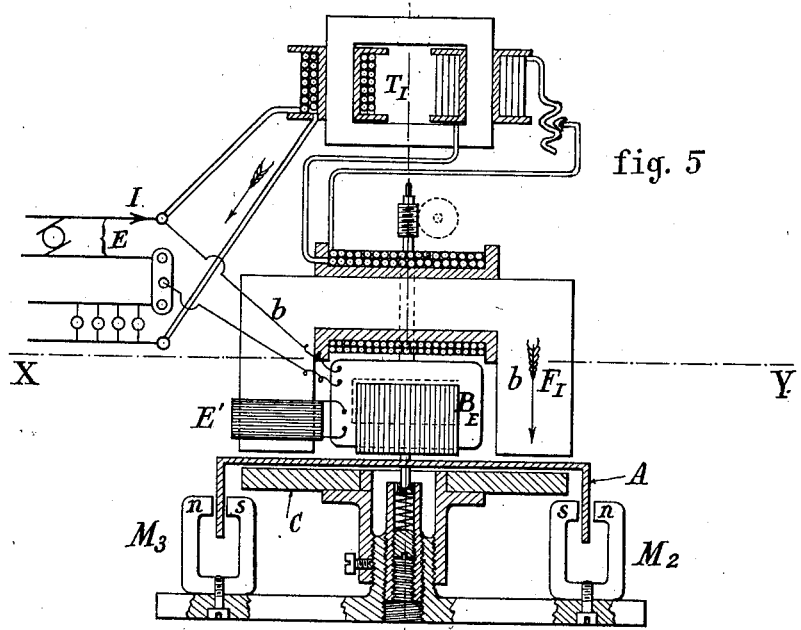

In certain cases I prefer to use electromagnets in lieu of the coils, and I make their polar surfaces and air-gaps as equal as possible and place them symmetrically in relation to the armature $A$. Figs. 4 and 5 represent a meter constructed in accordance with these conditions, the same letters representing the same parts as in Figs. 2 and 3. In this case it has been assumed that the electromagnets $B_E$ constituted the shunt-circuit. The phases flux $F_E$ and $F_I$ are concentrated on the armature $A$ by a common iron laminated disk $C$. The regulation of the time constants of the shunt-circuit and of the secondary circuit of the transformer, in which the electromagnet $B$ is included, is effected either by varying the distance of this disk or by regulating the adjustable resistance $R_I$ included into the secondary.

Figure 6:
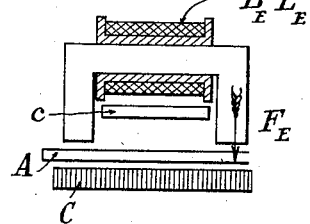

In certain cases I prefer to arrange the electromagnet $B_E$ in a special manner, so as to render the indications of the meter independent of the variations of the electromotive force and to regulate its action for small indications by introducing an auxiliary couple, which is a function of the electromotive force only and is intended to overcome the friction of the armature. This arrangement is shown in Fig. 6 and consists in adding a small magnetic disk $c$, which produces a deviation of flux. The flux $F_E$, which traverses the armature and produces the induction effects, is only a fraction of the flux produced by the shunt-circuit in the electromagnet $B_E$. By moving this disk to the one side or the other asymmetry is produced and tends to rotate the armature in one direction or the other when no current is passing through the main circuit. The arrangement is such that this auxiliary couple is added to the effect of the current. The same effect may be obtained by auxiliary winding. To this end it is sufficient in the arrangements shown in Figs. 2 and 3 to add a second shunt-circuit having a large non-inductive resistance and comprising a small winding on the coil $B_I$. This winding will produce a flux displaced in relation to $F_E$, which, in combination with $F_E$, will tend to rotate the armature. This action should be regulated so as to balance the friction.

In the apparatus shown in Figs. 4 and 5 the compounding is obtained by the flux produced by a winding $E'$, coiled on one of the arms $b$ of the electromagnet $B_I$ and connected in series with a winding coiled on the electromagnet $B_E$ and subjected to the inductive action of the flux $F_E$.

Fig. 7 shows a special arrangement of my meter for the purpose of simplifying the construction. The magnetic body of the transformer $T_I$ has beem combined with the cores of the shunt-electromagnets $B_E$ $B_E$.

In the drawings the electromagnet or electromagnets $B_I$, inserted into the secondary circuit of the transformer, have not been shown. They are placed symmetrically in relation to the electromagnets $B_E$ and the armature A. The deflecting or deviating disk hereinbefore described is arranged laterally opposite to the poles $x$ $x$.

I claim—

1. In a motor-meter of the induction type, the combination of coils in a shunt-circuit having a large self-induction; with a transformer, the primary circuit of which is traversed by the main current; coils included in the secondary circuit of said transformer; a movable armature acted upon by magnetism induced by said coils and also by magnetism induced by the shunt-circuit coils; and means for regulating the time constant of the secondary circuit of said transformer to equal the time constant of said shunt-circuit, whereby the torque is substantially proportional to the watts and independent of the displacement of the electromotive force and current, substantially as described.

2. In a motor-meter of the induction type, the combination of coils in a shunt-circuit having a large self-induction; with a transformer, the primary circuit of which is traversed by the main current; a movable armature acted upon by magnetism induced by said coils, and also by magnetism induced by the shunt-circuit coils; and an adjustable resistance included in the secondary circuit of said transformer for regulating the time constant of said secondary circuit to correspond to that of said shunt-circuit, substantially as described.

3. In a motor-meter of the induction type, the combination of coils in a shunt-circuit having a large self-induction; with a transformer, the primary circuit of which is traversed by the main current; coils included in the secondary circuit of said transformer; a movable armature in the magnetic field of magnetism induced by said coils and of the shunt-circuit coils; and means for deviating a fraction of the magnetic flux and thereby producing asymmetry.

4. In a motor-meter of the induction type, the combination of an electromagnet having coils in a shunt-circuit; with a transformer, the primary circuit of which is traversed by the main current; an electromagnet having coils included in the secondary circuit of said transformer; a movable armature in the field of both of said electromagnets; and an auxiliary winding on the electromagnet which is in the secondary circuit of the transformer, said coils being traversed by current proportional to the electromotive force.

In witness whereof I have hereunto set my hand, this 14th day of March, 1902, in the presence of two subscribing witnesses.

ARTHUR BLANCHET.

Witnesses:
DOUGLAS HORACE BRANDON,
EDWARD P. MACLEAN.